E. G. CROSSLEY.
WIND SHIELD.
APPLICATION FILED JAN. 25, 1918.
1,294,241.
Patented Feb. 11, 1919.
2 SHEETS—SHEET 1.
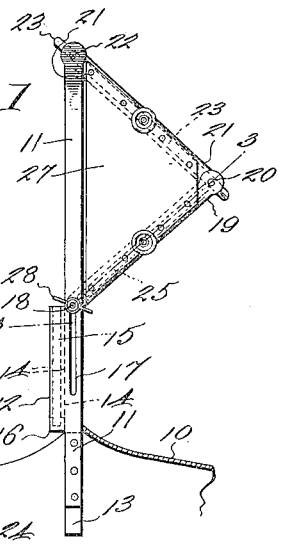
Witnesses
W. May. Durall
Inventor
E. G. Crossley,
By Victor J. Evans
Attorney

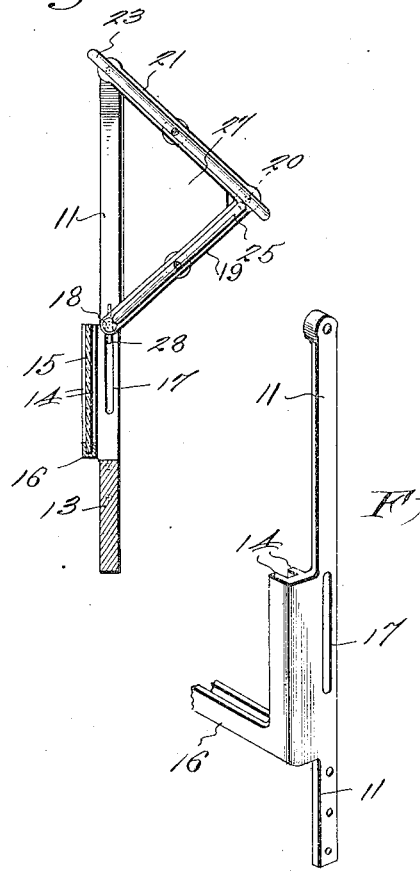
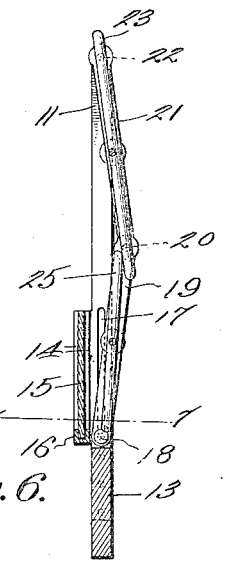
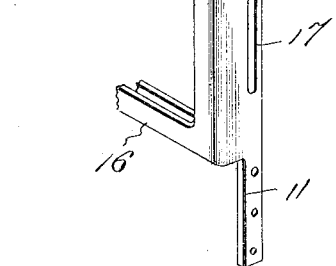
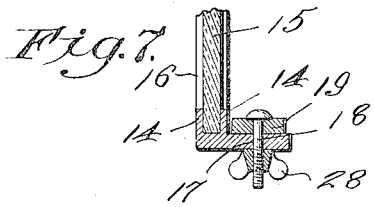

UNITED STATES PATENT OFFICE.

ERNEST G. CROSSLEY, OF STOCKBRIDGE, MICHIGAN.

WIND-SHIELD.

1,294,241. Specification of Letters Patent. Patented Feb. 11, 1919.

Application filed January 25, 1918. Serial No. 213,760.

*To all whom it may concern:*

Be it known that I, ERNEST G. CROSSLEY, a citizen of the United States, residing at Stockbridge, in the county of Ingham and State of Michigan, have invented new and useful Improvements in Wind-Shields, of which the following is a specification.

This invention relates to that class of wind shields for automobiles and other vehicles wherein a plurality of glass-containing frames are employed in combination with means for supporting the frames and holding the same at desired angles with respect to each other, whereby to provide for the ventilation of the machine, and also whereby the said sections may be so adjusted in case of storm that the rain beating against the shield will not obstruct the free view of the driver or passengers.

It is a further object of the invention to produce a wind shield in the nature of a storm protector, one of the glass carrying frames adapted to be adjusted at an outward angle so that rain will be shed therefrom, a second glass carrying frame being arranged to underlie the first mentioned frame and to be protected by the said first mentioned frame so that the transparency thereof will not be affected by the elements so that a clear line of vision in a straight ahead direction will be afforded the driver; means being provided upon the sides of the shield for preventing the entrance of rain, snow or the like, through the normally open ends of the said sides, and the device being further of such construction as to permit of the proper ventilation of the interior of the car therethrough.

It is further object of the invention to produce a device of this character which shall be of a comparatively simple construction, cheap to manufacture, readily applicable to any ordinary class of automobiles or the like and which will perform the functions for which it is devised with accuracy and certainty.

In the drawings,

Figure 1 is a side elevation illustrating the application of the improvement.

Fig. 2 is a front elevation of the same.

Fig. 3 is a sectional view approximately on the line 3—3 of Fig. 1.

Fig. 4 is a sectional view approximately on the line 4—4 of Fig. 2, looking in the direction of the arrows.

Fig. 5 is a similar view but illustrating the vertical positions.

Fig. 6 is a perspective view of one of the corner members or supports for the frames.

Fig. 7 is a sectional view approximately on the line 7—7 of Fig. 5.

To the dash board of the automobile 10, at the opposite ends thereof is secured the supporting posts 11 of my improvement. The posts 11 may be constructed of any desired material, metal preferred, the same upon their lower and inner edges being widened as at 12, the said widened portions projecting above the top edge of the dash board 13 and being provided, upon their inner edges with spaced vertically extending ribs 14—14 designed to receive the lower and permanent transparent plate 15. If desired, and as illustrated by the drawings, the vertical flange provided by the widened portions 12 of the posts 11 may have their lower ends connected by a grooved strip 16, and this strip receives the lower edge of the transparent plate 15.

The posts 11, outward of the widened or flanged portions 12 are provided with elongated slots 17 through which pass threaded shanks 18 secured to the lower portions of arms 19, the said slots 17 being of a length to permit of the said arms 19 being received upon the inner faces of the posts 11 when the said arms are brought to one position and also being of a length to permit of the said arms being arranged at a desired angle with respect to the said posts 11, when the said arms are brought to another position. The arms 19 have their outer ends pivotally connected as at 20, to arms 21, the said arms 21 having their free ends pivotally secured as at 22, to the upper ends of the posts 11. Approximately centrally pivoted to the oppositely disposed pair of arms 21 is a frame 23 which carries the upper transparent plate 24, and likewise approximately centrally secured to the oppositely disposed pairs of arms 19 is a frame 25 which carries the intermediate transparent plate 26. The plate 24 is wider than the plate 26, so that when the arms 19 and 21 are swung to protective position, and the frames 23 and 25 likewise brought to an outward angle with respect to the posts 11, the lower end of the plate 24 would extend beyond the outer edge of the plate 26. When in this last mentioned position, it will be apparent that the plate 24 will provide a shed for the rain, snow, sleet, or the like, contacting therewith, while the driver or occupants of the car will have a clear line of vision through the transparent plate 26, as well as through the permanent plate 15 if desired. The plate 26, being pivotally connected with the frame 25 may be swung at any desired angle with respect to the said frame, without interfering with the angular arrangement of the plate 24 so that proper ventilation may be received in the car.

In order to protect the open space provided between the angularly arranged arms 19 and 21, when the device is arranged as a guard, in case of storm, I secure to the inner side of the arms 21, and if desired to the inner edge of the posts 11, a fabric protector 27, the lower edge of the said protector being cut, so as to agree with the angular position of the arms 19, and the said lower edge may be provided with eyelets engaging with suitable studs or lugs upon the inner face of the said arms 19 or the members 27 may be secured to the arms in any other desired or preferred manner, whereby the same may be released when it is desired to bring the arms 19 and the frames 25 carried thereby to their vertical positions.

Screwed upon each of the threaded elements or bolts 18 is a wing nut 28, and by virtue of the frictional contact thereof with the outer sides of the posts 11, it will be apparent that the arms 19 may be retained in proper angular relation to the said posts, and consequently, the arms 21 may be likewise retained at a desired angle to the said posts. It is to be further understood that the pivotal engagement of the frames with the arms is such that the said frames are not permitted to tilt except when pressure is brought to bear thereagainst, as is ordinary in the construction of wind shields, so that when the said frames are properly arranged they cannot be influenced by weather or other conditions, but in this connection, it is to be noted, that the plate 24 extending beyond the outer edge of the plate 26 to contact with the said outer edge or with the end of the frame 25 carrying the said plate 26, an inward swinging movement of the frame 23 will be thus more effectively prevented.

Having thus described the invention, what I claim is:

1. In an automobile wind shield, posts, a transparent plate secured to the posts at the lower and inner portions thereof, said posts, outward of the said plate, having elongated slots, arms, members upon the arms passing through the slots, binding elements upon said members, an arm pivoted to the outer end of each of the posts and having its free end pivotally secured one to each of the first mentioned arms, frames centrally and pivotally secured to the respective pairs of arms, and transparent plates in the frames.

2. In an automobile wind shield, a pair of spaced posts which are widened upon their inner edges at the lower portions thereof, and the said widened portions having spaced ribs, a transparent plate arranged between the said ribs secured to the posts, said posts, outward of the said widened portions having elongated slots, an arm pivotally secured to each of the posts at the outer ends thereof, a fabric carried by the said arms and connected with the posts, a second pair of arms pivoted one to each of the first mentioned arms, laterally extending threaded elements upon the last mentioned arms passing through the referred to slots in the posts, wing nuts upon the said elements, a frame pivoted to each pair of arms, a transparent plate carried by each of the arms; and the upper frame being of a greater width than the lower frame, as and for the purpose set forth.

In testimony whereof I affix my signature

ERNEST G. CROSSLEY.